United States Patent
Sieradzki

(10) Patent No.: US 12,179,408 B2
(45) Date of Patent: Dec. 31, 2024

(54) CONTAINER FORMING AND FILLING USING HIGH VISCOSITY PRODUCT

(71) Applicant: Discma AG, Hünenberg (CH)

(72) Inventor: Richard Sieradzki, Novi, MI (US)

(73) Assignee: DISCMA AG, Hünenberg (CH)

( * ) Notice: Subject to any disclaimer, the term of this patent is extended or adjusted under 35 U.S.C. 154(b) by 0 days.

(21) Appl. No.: 17/999,411

(22) PCT Filed: Jun. 17, 2020

(86) PCT No.: PCT/IB2020/055669
§ 371 (c)(1),
(2) Date: Nov. 21, 2022

(87) PCT Pub. No.: WO2021/255498
PCT Pub. Date: Dec. 23, 2021

(65) Prior Publication Data
US 2023/0191685 A1    Jun. 22, 2023

(51) Int. Cl.
*B29C 49/46* (2006.01)
*B29C 49/12* (2006.01)
(Continued)

(52) U.S. Cl.
CPC ...... *B29C 49/42809* (2022.05); *B29C 49/121* (2022.05); *B29C 49/46* (2013.01); *B29C 49/041* (2013.01); *B29L 2031/7158* (2013.01)

(58) Field of Classification Search
CPC ...... B29C 49/42809; B29C 2049/4664; B29C 2049/465; B29C 2049/4652; B29C 49/46
See application file for complete search history.

(56) References Cited

U.S. PATENT DOCUMENTS 5,863,567 A    1/1999   Klaus
6,338,840 B1 *  1/2002   Allan ............... A45D 40/16
                                              425/149
(Continued)

FOREIGN PATENT DOCUMENTS

DE     102006010312 A1 *  9/2007 ............. A21C 11/16
DE     102015016124 A1    6/2017
(Continued)

OTHER PUBLICATIONS

Mechanical translation of DE-102006010312-A1 dated Sep. 2007. (Year: 2007).*
(Continued)

*Primary Examiner* — Robert B Davis
(74) *Attorney, Agent, or Firm* — Michael E. Dockins; Shumaker, Loop & Kendrick, LLP

(57) ABSTRACT

Ways for simultaneously forming and filling a container with a product are provided that include a mold cavity, a two-stage injection unit, and a blow nozzle. The mold cavity defines an internal surface and is configured to accept a preform. The two-stage injection unit receives and dispenses the product where a first stage includes an extruder and a second stage includes an accumulator. The extruder imparts mechanical energy to the product to reduce a viscosity of the product and transfers the reduced-viscosity product to the accumulator. The accumulator receives the reduced-viscosity product from the extruder and dispenses a charge of the reduced-viscosity product. The blow nozzle transfers the charge of the reduced-viscosity product dispensed from the accumulator into the preform to urge the preform to expand toward the internal surface of the mold cavity and form a resultant container.

6 Claims, 8 Drawing Sheets

(51) Int. Cl.
    *B29C 49/42*     (2006.01)
    *B29C 49/04*     (2006.01)
    *B29L 31/00*     (2006.01)

(56) References Cited

U.S. PATENT DOCUMENTS

2019/0061223 A1*   2/2019   Lhomme ................ B29C 49/12
2019/0275726 A1*   9/2019   Betz ........................ B29C 49/58
2020/0198216 A1*   6/2020   Sieradzki ................ B29C 49/06

FOREIGN PATENT DOCUMENTS

EP           3508326  A1     7/2019
JP           2840247  B2  *  12/1998

OTHER PUBLICATIONS

Mechanical translation of JP-2840247-B2 dated Oct. 1998. (Year: 1998).*

* cited by examiner

CONTAINER FORMING AND FILLING USING HIGH VISCOSITY PRODUCT

FIELD

The present technology relates to simultaneously forming and filling a container, including use of a two-stage injection unit to expand a preform and produce a resultant container filled with a high viscosity product.

INTRODUCTION

This section provides background information related to the present disclosure which is not necessarily prior art.

Various products are distributed in plastic containers, such as containers formed from one or more polymers. Common polymers used to form containers include polyesters, such as polyethylene terephthalate (PET), high and low density polyethylenes, polycarbonate, and polypropylene, among others. Plastic containers can be made using various blow molding processes including injection blow molding and extrusion blow molding.

Injection blow molding can be used to form certain plastic containers in one or more stages and can involve use of a stretch rod. In a two-stage injection stretch blow molding process, the plastic is first molded into a preform using an injection molding process. The preform includes the neck and finish of the container to be formed, which can include threading thereon, and a closed distal end. The preform can then be heated above the plastic glass transition temperature, longitudinally stretched with a stretch rod, and blown using high-pressure gas (e.g., air) into a container conforming to a mold. As the preform is inflated, it elongates and stretches, taking on the shape of the mold cavity. The plastic solidifies upon contacting the cooler surface of the mold and the finished hollow container is subsequently ejected from the mold. The injection stretch blow molding process can be used to form plastic containers for packaging consumer beverages, as well as other liquids and materials. However, the process has some inherent limitations, which include undesirable gate wells or discontinuities on the bottom portions of containers as well as limitations on the possible spectrum of designs that can be realized using the stretch blow molding process, such as containers incorporating a handle or void space therein.

Extrusion blow molding can be used to form certain plastic containers where a continuously extruded hot plastic tube or parison is captured within a mold and inflated against the inner surfaces of the mold to form a container blank. The mold can be designed to travel at the speed at which the extruded parison is moving when it closes on the parison so that the process can operate on a continuous basis. There are several different types of extrusion blow molding machines, including shuttle molds that are designed to travel in a linear motion and extrusion blow molding wheels that travel in a rotary or circular motion. While extrusion blow molding processes have addressed a need for an improved plastic container that obviates some of the disadvantages inherent to containers fabricated using the stretch blow molding process, the extrusion blow molding processing requires a number of steps to form the container then later fill and cap the container. As a result, significant costs can be incurred while separately performing the container forming and filling processes, including transport and time commitments.

Blow molding containers and subsequent filling of containers have consequently developed as two independent processes, in many cases operated at different facilities. In order to make container filling more cost effective, some filling facilities have installed blow molding equipment on site, in many cases integrating blow molders directly into filling lines. Equipment manufacturers have recognized this advantage and are selling "integrated" systems that are designed to insure that the blow molder and the filler are fully synchronized. Despite the efforts in bringing the two processes together, blow molding and filling continue to be two independent, distinct processes. As a result, significant costs may be incurred in separately performing these two processes.

In response to the separate blow molding and filling processes, certain liquid or hydraulic blow molding systems have arisen that form and fill a container in a single operation. The liquid product used to form and fill the preform into the resultant container can thereafter remain the finished container. Combination of the forming and filling steps can therefore optimize packaging of a liquid product by eliminating the transport of empty bottles and time demands related to subsequent filling operations.

There are, however, certain obstacles in using a highly viscous product to fill and form a container, where the highly viscous product remains in the resultant container. Such highly viscous products include those having paste-like or gel-like consistencies that can behave more like solids than liquids. Moving and dispensing such highly viscous products can be problematic. Forming and filling time of a container, likewise, can depend on how fast a highly viscous product can be transferred into a preform, while accounting for cooling of the heated preform and expansion time to conform the preform to a mold. It can be important to balance thermal energy loss of the preform and the rate of filling/expansion of the forming container. Certain highly viscous products (e.g., viscosities in the range of thousands of centipoise to tens of thousands of centipoise) cannot be used to form and fill preforms into resultant containers using present systems, as such systems cannot transfer such highly viscous products within a time window and maintain a preform heat profile to reproducibly form and fill a resultant container or where the resultant container, if formed intact, exhibits satisfactory performance characteristics.

SUMMARY

The present technology includes systems, processes, and articles of manufacture that relate to use of a highly viscous product to simultaneously form and fill a container under certain pressure conditions, where the product remains in the container.

Ways are provided for simultaneously forming and filling a container with a product that include or employ a mold cavity, a two-stage injection unit, and a blow nozzle. The mold cavity defines an internal surface and is configured to accept a preform. The two-stage injection unit is configured to receive the product and dispense the product, where the two-stage injection unit includes a first stage comprising an extruder and a second stage comprising an accumulator. The extruder is configured to impart mechanical energy to the product to reduce a viscosity of the product and transfer the reduced-viscosity product to the accumulator. The first stage can also include a heater configured to impart thermal energy to the product to further reduce the viscosity of the product. The accumulator is configured to receive the reduced-viscosity product from the extruder and dispense a charge of the reduced-viscosity product. The accumulator can include a piston configured to drive the charge of the reduced-viscosity product from the accumulator through the blow nozzle at a pressure and within a time period to urge the preform to expand toward the internal surface of the mold cavity and form the resultant container. The blow nozzle is configured to transfer the charge of the reduced-viscosity product dispensed from the accumulator into the preform to urge the preform to expand toward the internal surface of the mold cavity and form a resultant container, where the reduced-viscosity product remains within the container as an end product. A stretch rod can also be included that is configured to mechanically stretch the preform within the mold cavity prior to the charge of the reduced-viscosity product being transferred into the preform by the blow nozzle.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 1 is a schematic depiction of a system for simultaneously forming and filling a container in accordance with the present technology, where a heated preform is passed into a mold station, a two-stage injection is fluidly coupled to a blow nozzle, and a stretch rod is configured to pass through the blow nozzle into the preform.

FIG. 2 is a schematic depiction of the system illustrated in FIG. 1, where the mold halves close around the preform and a product can be processed by the two-stage injection unit, where an extruder in a first stage of the two-stage injection unit imparts mechanical energy to the product to reduce a viscosity of the product and begins to transfer the reduced-viscosity product to an accumulator in the second stage of the two-stage injection unit.

DETAILED DESCRIPTION

Figure 1:
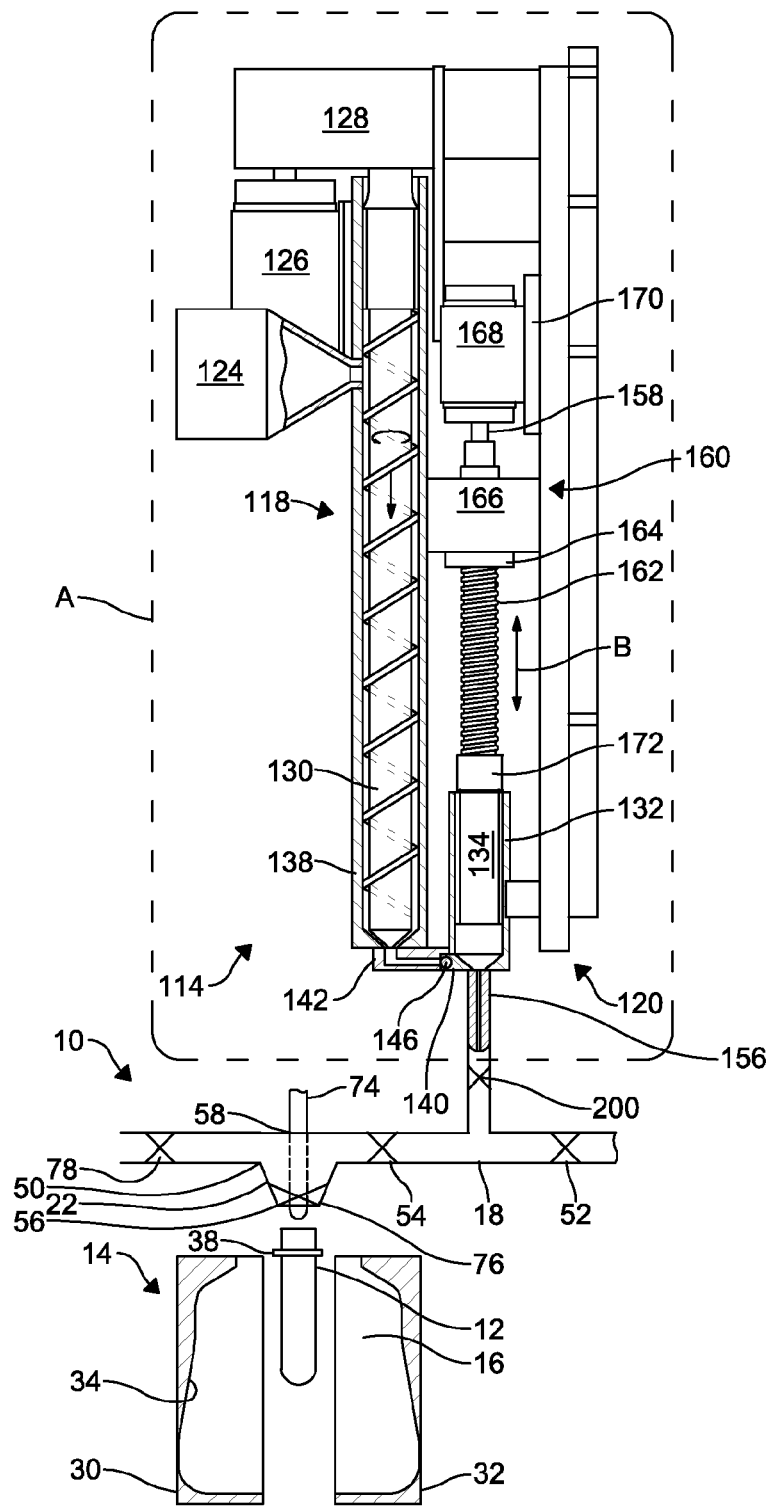

The following description of technology is merely exemplary in nature of the subject matter, manufacture and use of one or more inventions, and is not intended to limit the scope, application, or uses of any specific invention claimed in this application or in such other applications as can be filed claiming priority to this application, or patents issuing therefrom. Regarding methods disclosed, the order of the steps presented is exemplary in nature, and thus, the order of the steps can be different in various embodiments. "A" and "an" as used herein indicate "at least one" of the item is present; a plurality of such items can be present, when possible. Except where otherwise expressly indicated, all numerical quantities in this description are to be understood as modified by the word "about" and all geometric and spatial descriptors are to be understood as modified by the word "substantially" in describing the broadest scope of the technology. "About" when applied to numerical values indicates that the calculation or the measurement allows some slight imprecision in the value (with some approach to exactness in the value; approximately or reasonably close to the value; nearly). If, for some reason, the imprecision provided by "about" and/or "substantially" is not otherwise understood in the art with this ordinary meaning, then "about" and/or "substantially" as used herein indicates at least variations that can arise from ordinary methods of measuring or using such parameters.

All documents, including patents, patent applications, and scientific literature cited in this detailed description are incorporated herein by reference, unless otherwise expressly indicated. Where any conflict or ambiguity can exist between a document incorporated by reference and this detailed description, the present detailed description controls.

Although the open-ended term "comprising," as a synonym of non-restrictive terms such as including, containing, or having, is used herein to describe and claim embodiments of the present technology, embodiments can alternatively be described using more limiting terms such as "consisting of" or "consisting essentially of." Thus, for any given embodiment reciting materials, components, or process steps, the present technology also specifically includes embodiments consisting of, or consisting essentially of, such materials, components, or process steps excluding additional materials, components or processes (for consisting of) and excluding additional materials, components or processes affecting the significant properties of the embodiment (for consisting essentially of), even though such additional materials, components or processes are not explicitly recited in this application. For example, recitation of a composition or process reciting elements A, B and C specifically envisions embodiments consisting of, and consisting essentially of, A, B and C, excluding an element D that can be recited in the art, even though element D is not explicitly described as being excluded herein.

As referred to herein, all compositional percentages are by weight of the total composition, unless otherwise specified. Disclosures of ranges are, unless specified otherwise, inclusive of endpoints and include all distinct values and further divided ranges within the entire range. Thus, for example, a range of "from A to B" or "from about A to about B" is inclusive of A and of B. Disclosure of values and ranges of values for specific parameters (such as amounts, weight percentages, etc.) are not exclusive of other values and ranges of values useful herein. It is envisioned that two or more specific exemplified values for a given parameter can define endpoints for a range of values that can be claimed for the parameter. For example, if Parameter X is exemplified herein to have value A and also exemplified to have value Z, it is envisioned that Parameter X can have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if Parameter X is exemplified herein to have values in the range of 1-10, or 2-9, or 3-8, it is also envisioned that Parameter X can have other ranges of values including 1-9, 1-8, 1-3, 1-2, 2-10, 2-8, 2-3, 3-10, 3-9, and so on.

When an element or layer is referred to as being "on," "engaged to," "connected to," or "coupled to" another element or layer, it can be directly on, engaged, connected or coupled to the other element or layer, or intervening elements or layers can be present. In contrast, when an element is referred to as being "directly on," "directly engaged to," "directly connected to" or "directly coupled to" another element or layer, there can be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. can be used herein to describe various elements, components, regions, layers and/or sections, these elements, components, regions, layers and/or sections should not be limited by these terms. These terms can be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, can be used herein for ease of description to describe one element or feature's relationship to another element(s) or feature(s) as illustrated in the figures. Spatially relative terms can be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device can be otherwise oriented (rotated 90 degrees or at other orientations) and the spatially relative descriptors used herein interpreted accordingly.

The present technology allows for simultaneously forming and filling a container using a highly viscous product dispensed from a two-stage injection unit to provide a product-filled container. Various systems, processes, and articles of manufacture described herein allow for simultaneously forming and filling a container with a product by making use of a mold cavity, a two-stage injection unit, and a blow nozzle. The mold cavity defines an internal surface and is configured to accept a preform. The two-stage injection unit is configured to receive the product and dispense the product. The two-stage injection unit includes a first stage comprising an extruder and a second stage comprising an accumulator. The extruder is configured to impart mechanical energy to the product to reduce a viscosity of the product and transfer the reduced-viscosity product to the accumulator. The first stage can include a heater configured to impart thermal energy to the product to further reduce the viscosity of the product. The accumulator is configured to receive the reduced-viscosity product from the extruder and dispense a charge of the reduced-viscosity product. The accumulator can include a piston configured to drive the charge of the reduced-viscosity product from the accumulator through the blow nozzle at a pressure and within a time period to urge the preform to expand toward the internal surface of the mold cavity and form the resultant container. In this way, the present technology is capable of using highly viscous products (e.g., viscosities in the range of thousands of centipoise to tens of thousands of centipoise) to form and fill containers. Reduction in viscosity of such products by the extruder and the rapid dispensing thereof by the accumulator can be necessary to successfully dispensing such highly viscous products within a time window where the preform can maintain a heat profile to reproducibly form and fill a resultant container that exhibits desired performance characteristics.

With reference to the several figures, an embodiment of a system according to the present technology is shown and generally referred to as reference numeral 10. FIGS. 1-7 show an embodiment of a sequence for simultaneously forming and filling a container C using the system 10 in accordance with the present technology. As will be appreciated from the following description, the system 10 and associated method utilize a product to impart the pressure required to expand or further expand a preform 12 to take on the shape of a mold cavity 16, thus simultaneously forming and filling a resultant container C with the product.

An embodiment of a two-stage injection unit including an extruder and an accumulator is shown enclosed by a stippled box denoted "A" in FIGS. 1-7. An example of the two-stage injection unit includes the two-stage electric injection unit described by U.S. Pat. No. 5,863,567 to M. Barr Klaus, which is incorporated herein by reference. One skilled in the art can appreciate that certain other embodiments and features described in U.S. Pat. No. 5,863,567 to M. Barr Klaus can be employed herein. Likewise, other two-stage injection units employing a first stage having an extruder and a second stage having an accumulator can be employed in the present technology according to the guidance and principles described herein. Thermal energy can operate in conjunction with mechanical energy imparted by the extruder to reduce the viscosity of a product that will be used to form and fill a container, whereupon the reduced-viscosity product is transferred to the accumulator. Certain two-stage injection units can include where the first stage has a heater configured to impart thermal energy to the product to further reduce the viscosity of the product. It is further noted that instead of electrical motors driving the extruder and/or accumulator, as provided in the embodiment depicted herein, it is understood that other drive means can be employed, including one or more hydraulic drives and/or pneumatic drives. Various types of extruders and various types of accumulators can be used, as well. Two-stage injection units suitable for use in the present technology further include those available as Mold-Masters E-Multi from Milacron LLC (Cincinnati, Ohio).

The components of the injection unit 114 are designed to implement electric motor drive technology in a two-stage injection unit. The primary elements include an electrically driven extruder 118 and an electrically driven accumulator 120. The extruder 118 can operate in a manner that continuously imparts mechanical energy to the product to reduce a viscosity of the product by use of a non-reciprocating feed screw 130. It is possible, however, to configure the two-stage injection unit 114 with a reciprocating feed screw.

Product can be supplied to the extruder 118 in various ways, such as by a hopper 124. The rotational power for the screw 130 in the extruder 118 can be provided by an electric motor 126 connected to a speed reduction gearbox 128 to drive the screw 130. As the movement of the embodiment of the screw 130 shown in the figures is rotational only, the drive system can be simplified over two-stage injection units that have a screw which reciprocates.

The accumulator 120 can be configured as a variable volume reservoir by virtue of a cylindrical barrel 132 and a piston 134 that moves linearly within the barrel 132. The relative size of the barrel 132 and piston 134, as well as the stroke of the piston 134, can vary according to a charge of reduced-viscosity product required to form and fill the resultant container for a particular mold. In the configuration of accumulator 120, the end-shape of the barrel 132 and piston 134 can be designed in a way that minimizes the amount of reduced-viscosity product remaining in the barrel 132 when the piston 134 is fully extended.

By optimizing the length of stroke and diameter of the piston 134, certain advantages can be realized. The diameter of the piston 134 can dictate the load carrying requirements for a ball screw that converts rotary motion of the motor into linear motion for the piston 134. However, larger charge capacities can be easily accomplished with the two-stage design by providing increased length of stroke at relatively small diameters. For example, the embodiment of the two stage design depicted in the figures can yield an injection capability of at least 150 oz. at a 2.75 inch diameter piston 134 that can operate at 20,000 psi with a 5.5 in diameter ball screw.

In sizing the components of melt accumulator 120, certain advantages can be realized when a ratio of the full stroke of the piston 134 to the diameter of the piston 134 is eight or higher, preferably in the range of ten to fifteen (this criteria is similar to the L/D of a reciprocating screw). Such configurations of the accumulator 120 enable use of commercially available ball screws, while providing a longer stroke (improving shot size accuracy and repeatability) at higher dispensing pressures.

The outlet of the extruder 118 connects to accumulator 120 via a suitable conduit 142. At a convenient point between the extruder 118 and the inlet 140 to the accumulator 120, a ball check valve 146 or other suitable non-return or anti-back-flow device can be provided to control the direction of the flow through conduit 142. When the accumulator 120 is activated to dispense the charge of reduced-viscosity product through the blow nozzle and into the preform within the mold cavity, the check valve 146 prevents a back-flow of product into the extruder 118 due to the pressure differential. The outlet of the accumulator 120 can be fluidly coupled to the blow nozzle 22 by fluidly coupling nozzle 156 of the two-stage injection unit 114 and conduit 18 (as shown). Or, conduit 18 can be configured as a manifold to divide the charge of product into portions that can be directed to multiple blow nozzles with respective preforms and molds. One example of a manifold that can split the charge of the reduced-viscosity product in half is shown in FIG. 9A and another example of a manifold that can split the charge of the reduced-viscosity product into quarters is shown in FIG. 9B.

The piston 134 of accumulator 120 can be actuated by an electromechanical drive assembly 160. The drive assembly 160 can include a ball screw 162, a ball nut 164 with support housing 166, a variable speed electric motor 168, and a motor support 170 that allows for linear movement of the motor 168. The ball nut 164 can be carried within the support housing 166 and can be restrained from rotation by its attachment to housing 166 through suitable means, such as a load cell. The driven end of the ball screw 162 connects to the motor shaft 158; the opposite end of the screw 162 connects to the piston 134 of the accumulator 120 by means of a coupling 172. The coupling 172 can allow the ball screw 162 to rotate freely with respect to the piston 134 to transmit linear force from the ball screw 162 to the piston 134 without adversely affecting the product contained in the accumulator 120. In particular, the piston 134 can be "free-floating" in the cylinder of the accumulator 120, so that only the linear movement of the piston is affected by the ball screw 162.

As the shaft 158 of the motor 168 can attach directly to the ball screw 162, the motor 168 can reciprocate back and forth as the ball screw 162 is used to move the piston 134. Accordingly, the support 170 for the motor 168 can be configured to provide stability for the motor 168 while allowing it to move linearly in a direction parallel to the movement of the piston 134, as indicated by double-headed arrow B.

A cycle of operation of the two-stage injection unit 14A can include the following aspects. The feed screw 30A can be rotated within barrel 138 by the extruder motor 126 to begin imparting mechanical energy to the product, thereby reducing the viscosity of the product, and transferring the reduced-viscosity product to the accumulator 120. The rotation of the screw 130 builds pressure at the end of the screw 130, moving (opening) the ball check valve 146 and causing reduced-viscosity product to flow through the conduit 142 and into the accumulator 120. When the pressure of the reduced-viscosity product reaches a certain level, it will begin to force the piston 134 rearwardly, thereby moving the ball screw 162 and motor 168 toward the rear of injection unit 114 (support housing 166 remains stationary). Specifically, the rearward movement of piston 134 applies a force to ball screw 162 through coupling 172, causing ball screw 162 to move likewise to the rear; as the ball screw 162 is pushed through ball nut 164 it rotates.

The rate of rearward movement of the piston 134 (and ball screw 162) can be controlled by the motor 168. In particular, the motor 168 can be used as a brake to impede the rotation of ball screw 162, which slows the rearward movement of the piston 134, thereby increasing the back pressure on the product. Alternatively, the motor 168 can be used to speed up the rotation and rearward movement of the ball screw 162, which increases the rate at which the piston 134 moves back, thereby decreasing the back pressure on the product.

The extrusion function is complete and rotation of the feed screw 130 is stopped when a sufficient charge of reduced-viscosity is accumulated in front of the piston 134 in the accumulator 120, as required to fill the cavity of the mold or cavities of the molds when a manifold is employed as part of conduit 18, fluidly coupling multiple blow nozzles with respective preforms and molds. To initiate the dispensing function of the accumulator 120, the motor 168 can be rotated in a clockwise direction causing the ball screw 162 to advance through ball nut 164 which is constrained by support housing 166. The translational (linear) movement of screw 162 is imparted to the piston 134 housed in the accumulator 120. As they are components in the same assembly, the motor 168 can also have translational movement along with the ball screw 162 as the piston 134 is moved linearly in the cylinder 132 of the accumulator 120.

The forward movement of the piston 134 causes the charge of reduced-viscosity product to be forced through the nozzle 156 where it can be dispensed and transferred through conduit 18 to the blow nozzle 22 to the preform 12 within the mold 14. The injection pressure generated by movement of the piston 134 moves the ball check valve 146 to a position that prevents transfer of the product into the extruder 118. After the bulk of product is transferred into the mold cavity 116 to form and fill the preform 12 into container C, the injection accumulator 120 can stop and hold for a predetermined time, as desired. At this point, the injection accumulator 120 is essentially emptied of product. In this manner, the dispensing of reduced-viscosity product is accomplished by applying sufficient force to move the piston 134 rapidly forward in the cylinder 132, forcing the reduced-viscosity product to flow through the outlet of the injection accumulator 120, on through the nozzle 56 and conduit 18, where it is transferred by the blow nozzle 22 into the perform 12 within the mold 14.

A valve 200, such as a check valve or a selectively actuated valve can be positioned in the fluid path between the two-stage injection unit 114 and the blow nozzle 22. This valve 200 can be used to control movement of any residual product in the fluid path between the two-stage injection unit 114 and the blow nozzle 22, including where the two-stage injection unit 114 is used to provide product at a lower pressure when product does not need a substantial reduction in viscosity in handling by the extruder 118 and the accumulator 112. The valve 200 can operate to prevent dripping or flowing of residual lower viscosity product in the fluid path between the two-stage injection unit 114 and the blow nozzle 22. This can improved performance with lower viscosity products and allow the system 10 to be used with high viscosity products as well as low viscosity products.

Figure 2:
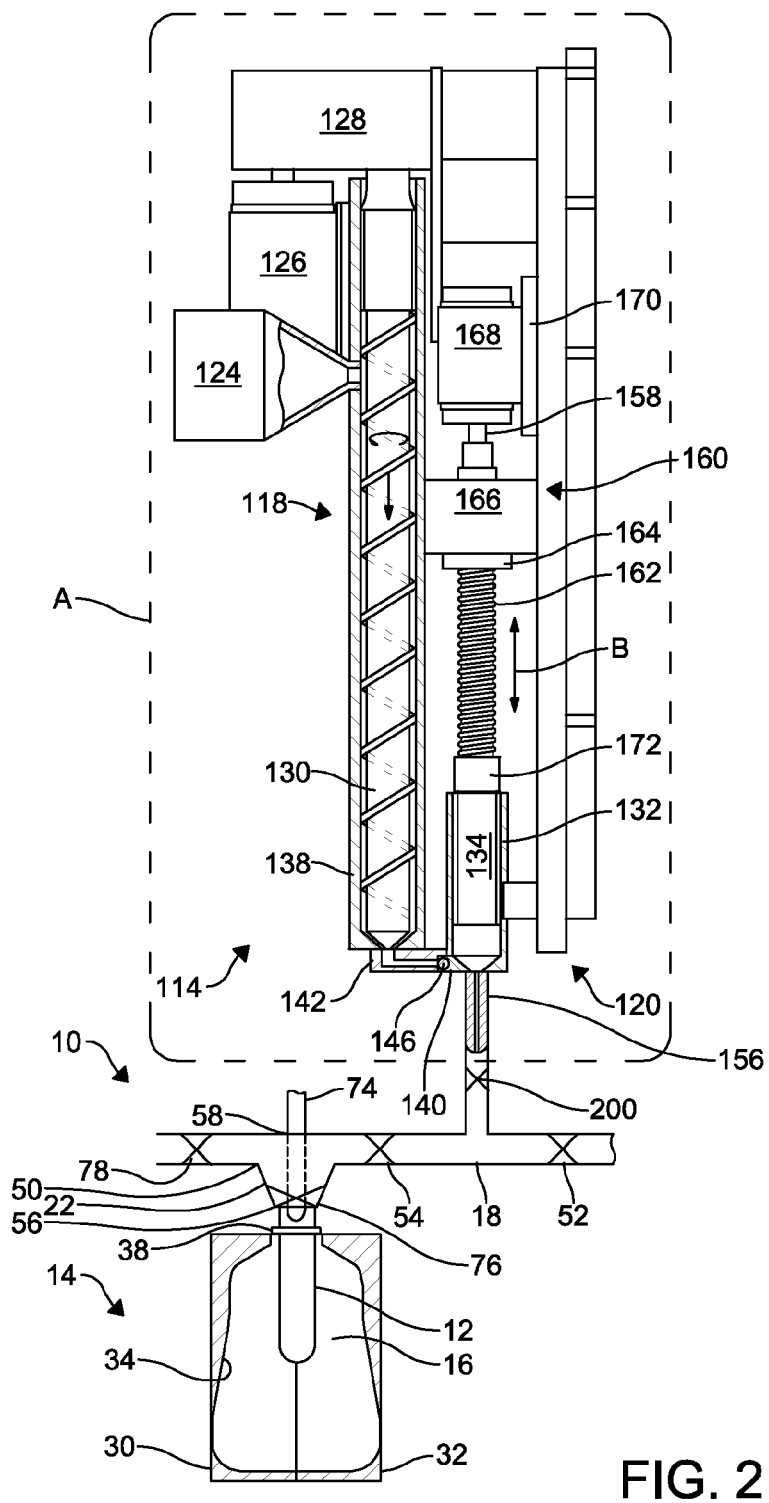

Operation of the two-stage injection unit 114 is now described in relation to further aspects of the overall system 10 in simultaneously forming and filling a container. With reference to FIGS. 1-2, the system 10 can generally comprise the mold 14 having a mold cavity 16, the two-stage injection unit 114, the blow nozzle 22, and a stretch rod 26. The exemplary mold cavity 16 illustrated in the figures includes two mold halves 30, 32 that cooperate to define an interior surface 34 corresponding to a desired outer profile of the resultant container C. The mold cavity 16 can be moveable from an open position (FIG. 1) to a closed position (FIG. 2) such that a support ring 38 of the preform 12 can be captured at an upper end of the mold cavity 16. The preform 12 can be formed of a polyester material, such as polyethylene terephthalate (PET), can have a shape similar to a test-tube with a generally cylindrical cross section, and can have a length approximately fifty percent (50%) of a height of the resultant container C. The support ring 38 can be used to carry or orient the preform 12 through and at various stages of manufacture. For example, the preform 12 can be carried by the support ring 38, the support ring 38 can be used to aid in positioning the preform 12 in the mold cavity 16, and an end consumer can use the support ring 38 to carry the plastic container C once manufactured.

The blow nozzle 22 can generally define an inlet 50 for accepting the product from the two-stage injection unit 114 and an outlet 56 for delivering the reduced-viscosity product into the preform 12. Receipt of the reduced-viscosity product into the preform 12 can coincide with opening valves 200, 54, 76 positioned in the fluid transfer path for the reduced-viscosity product into the preform 12 in passing from the nozzle 156 of the two-stage injection unit 114, through conduit 18 and the blow nozzle 22, and finally into the preform 12. As shown, valve 76 can be positioned within the blow nozzle 22 to control delivery of the reduced-viscosity product into the preform 12, where valve 76 is open when the blow nozzle 22 transfers a portion of the reduced-viscosity product into the preform 12 to partially expand the preform 12 toward the internal surface 34 of the mold cavity 16. It is appreciated that the outlet 56 can define a shape complementary to the preform 12 near the support ring 38 such that the blow nozzle 22 can be coupled or easily engage or mate with the preform 12 during the forming/filling process. In certain embodiments, the blow nozzle 22 can define an opening 58 for slidably accepting the stretch rod 26 used to initiate mechanical stretching of the preform 12.

The reduced-viscosity product can be introduced into the preform 12 and resultant plastic container C at an elevated temperature (e.g., above room temperature) from the two-stage injection unit 114. For example, operation of the extruder 118 to impart mechanical energy to the product can also result in an increase in temperature of the product due to the friction and pressure applied by the extruder 118 to the product. The increase in thermal energy to the product can operate in conjunction with mechanical energy imparted by the extruder to reduce the viscosity of the product, where the warmed and reduced-viscosity product is transferred to the accumulator 120. Although not shown in the embodiment depicted in the figures, certain two-stage injection units can include where the first stage includes a heater configured to impart thermal energy to the product to further reduce the viscosity of the product. For example, a heater can be in contact with the barrel 138 of the extruder 118. The increase in temperature to the product therefore provides a warmed and reduced-viscosity product to the second stage including the accumulator 120.

The system 10 can be further operated to simultaneously form and fill the plastic container C according to the following aspects. In certain embodiments, the preform 12 can be sterilized by steam or other means prior to being introduced into the mold cavity 16. By subjecting the preform 12 to a sterilizing technique (e.g., steam and/or heat), an aseptic preform and resulting container C can be created as the reduced-viscosity product can be sterilized by the pressure and temperature experienced within the two-stage injection unit 114. The container C therefore need not be formed by a hot-filling process. Other examples of sterilizing the preform 12 include contact with one or more various sterilizing mediums, such as liquid peroxide. The preform 12 can also be passed through an oven in excess of 212° F. (100° C.) and nearly immediately subjected to forming and filling where the resultant filled container C can then be capped. In this way, the opportunity for an empty container to be exposed to the environment where it might become contaminated is minimized and the cost and complexity of aseptic filling can be reduced.

As shown, the preform 12 is placed into the mold cavity 16; see FIGS. 1-2. For example, a machine (not illustrated) can transfer the preform 12, heated to a temperature between approximately 190° F. to 250° F. (approximately 88° C. to 121° C.), to the mold 14 where the preform 12 is enclosed within the mold cavity 16. As the preform 12 is placed into the mold cavity 16, the two-stage injection unit 114 can begin operating on the viscous product to form the reduced-viscosity product in preparation for dispensing such. The mold halves 30, 32 of the mold cavity 16 can close thereby capturing the preform 12; see FIG. 2. The blow nozzle 22 can form a seal at a finish of the preform 12. The mold cavity 16 can be heated to a temperature between approximately 250° F. to 350° F. (approximately 93° C. to 177° C.) in order to impart increased crystallinity levels within the resultant container C. In other embodiments, the mold cavity 16 can be provided at ambient or cold temperatures, between approximately 32° F. to 90° F. (approximately 0° C. to 32° C.). The product can be processed by the extruder 118 in the first stage of the two-stage injection unit 114 so that the reduced-viscosity product can start to be transferred and received by the accumulator 120 in the second stage of the two-stage injection unit 114.

Figure 3:
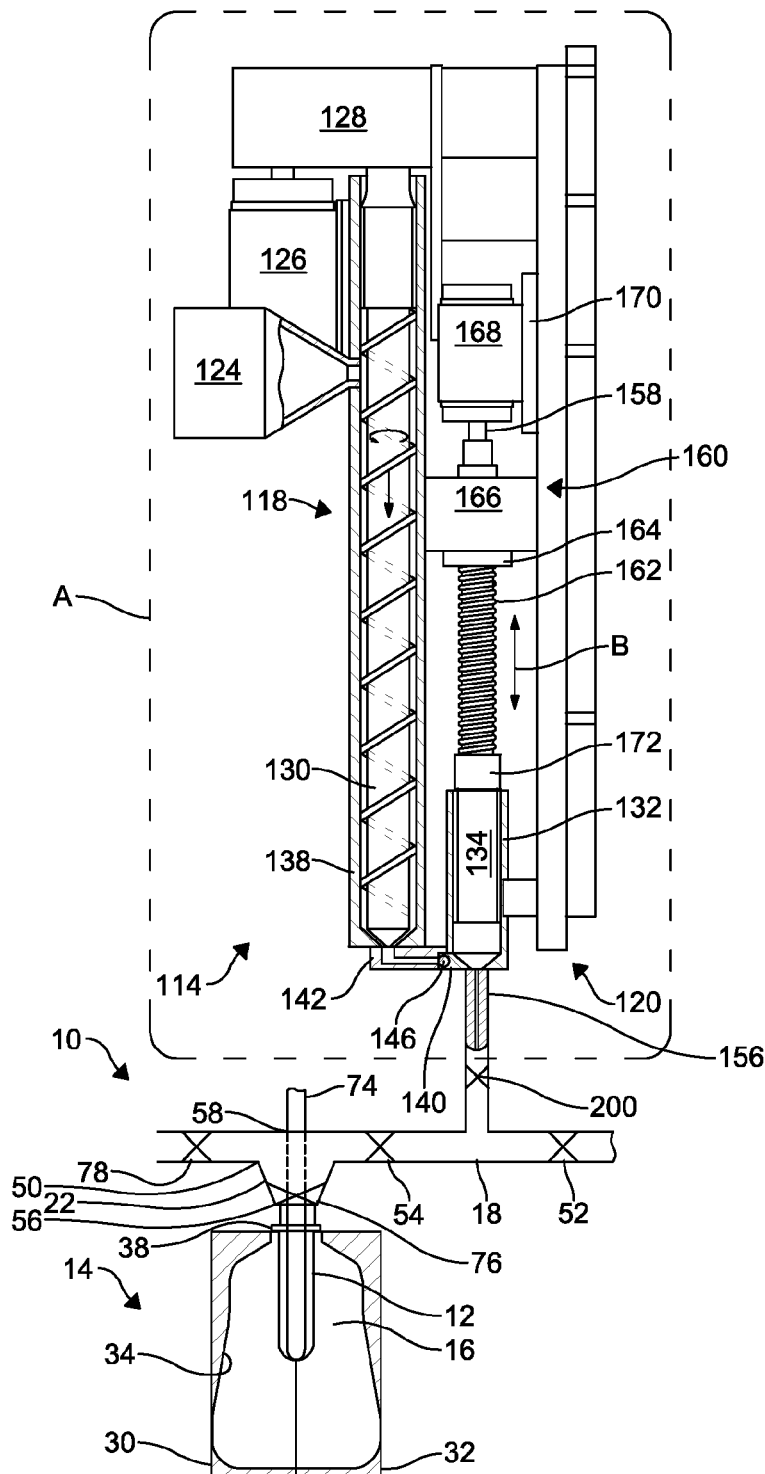
FIG. 3 is a schematic depiction of the system illustrated in FIG. 2, where a stretch rod extends into the preform to initiate mechanical stretching thereof.
Figure 4:
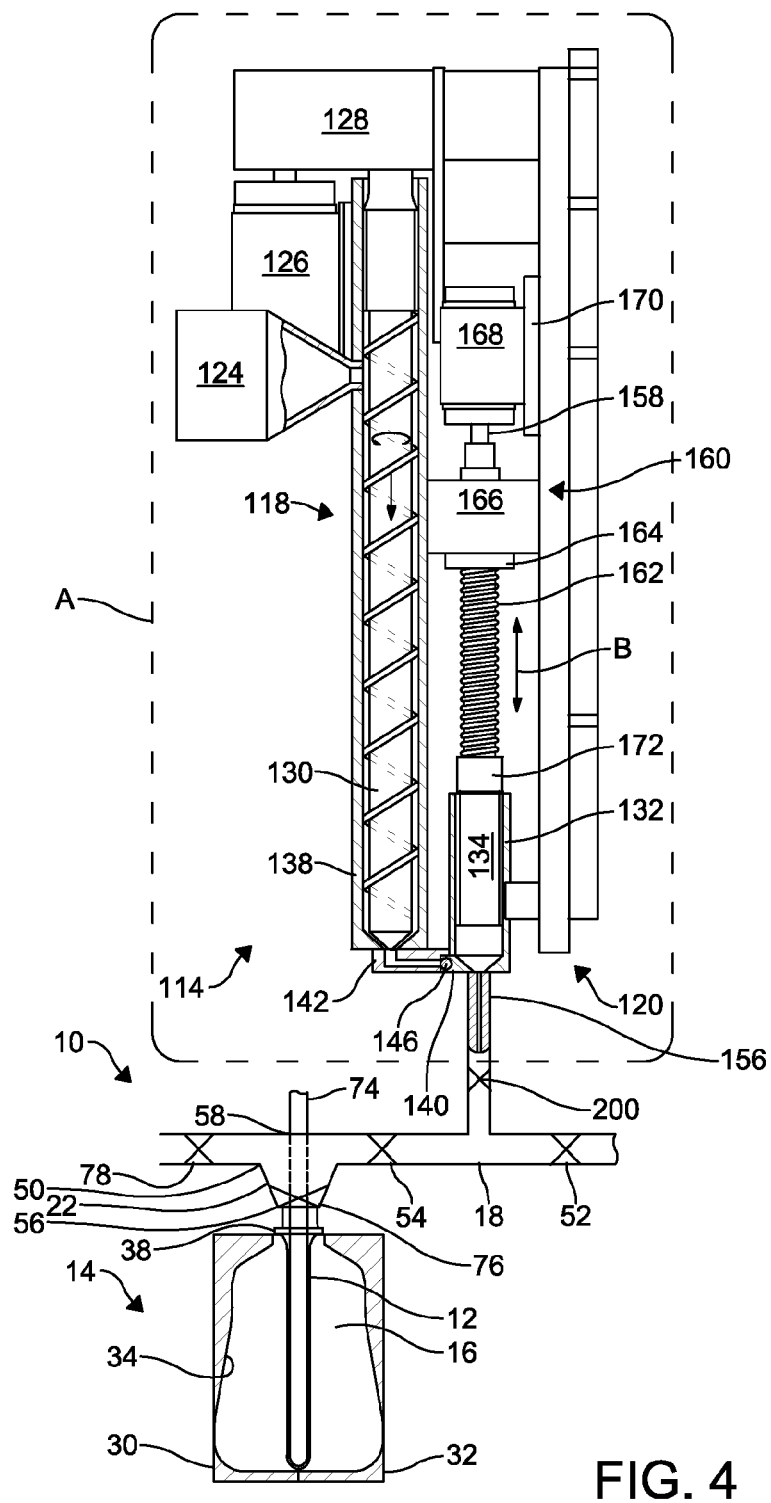
FIG. 4 is a schematic depiction of the system of FIG. 3, where the stretch rod has fully stretched the preform and where the accumulator has received a charge of reduced-viscosity product from the extruder.

Turning now to FIG. 3, the stretch rod 26 can extend into the preform 12 to initiate mechanical stretching of the preform 12. With reference to FIG. 4, the stretch rod 26 continues to stretch the preform 12 thereby thinning the sidewalls of the preform 12 and forming a stretched preform 12. The accumulator 120 can continue to receive the reduced-viscosity product from the extruder 118 until a charge of the reduced-viscosity product is contained therein. The charge of the reduced-viscosity product can correspond to an appropriate volume suitable to form and fill the resultant container C. Where a manifold (e.g., FIGS. 8A-8B) is included in the system 10, providing multiple branching points in coupling the two-stage injection unit 114 to multiple blow nozzles 22, the charge can be sized so that division thereof by the manifold can provide appropriately sized portions that can be directed to corresponding blow nozzles 22, preforms 12, and molds 14.

Figure 5:
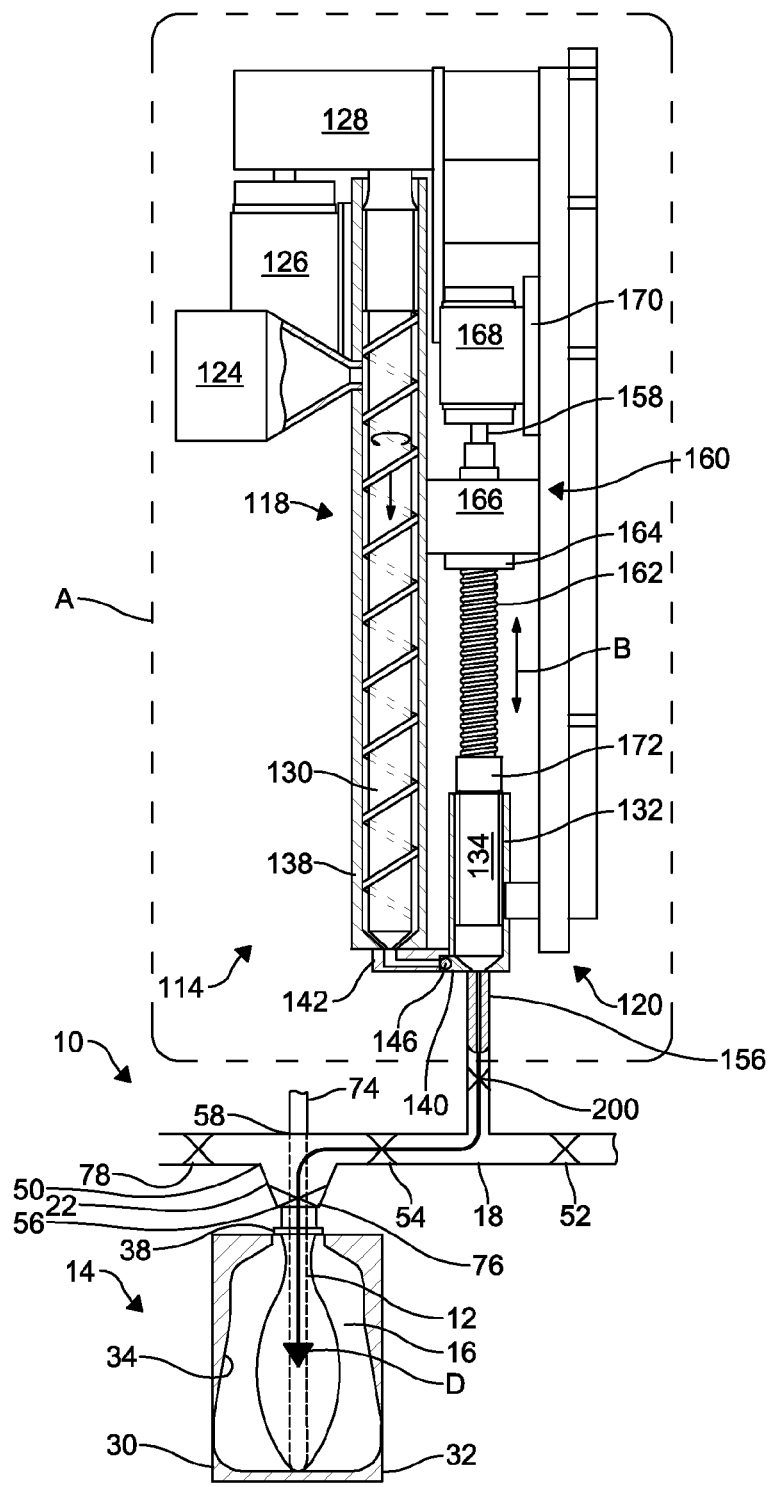
FIG. 5 is a schematic depiction of the system of FIG. 4, where the charge of reduced-viscosity product is dispensed from the accumulator into the stretched preform to partially expand the stretched preform to form a partially expanded preform.

With specific reference to FIG. 5, the accumulator 120 of the two-stage injection unit 114 can then begin to dispense a charge of the reduced-viscosity product from nozzle 156, where the charge is transferred through the blow nozzle 22 and into the preform 12. Dispensing the charge of the reduced-viscosity product into the preform 12 follows the path of arrow D shown in FIG. 5. In providing the reduced-viscosity product to the blow nozzle 22, valves 54, 76 (if present) are positioned in an open state. In this way, the reduced-viscosity product is transferred through the blow nozzle 22 and through valve 76 into the stretched preform 12 to partially expand the stretched preform 12 toward the internal surface 34 of the mold cavity 16 to form a partially expanded preform 12. As the reduced-viscosity product causes the stretched preform 12 to partially expand toward the interior surface 34 of the mold cavity 16, any residual air within the preform 12 can be vented through a passage 74 defined in the stretch rod 26. The two-stage injection unit 114 can be configured to provide the reduced-viscosity product within a time period and at a pressure to simultaneously form and fill the container C with the product.

Figure 6:
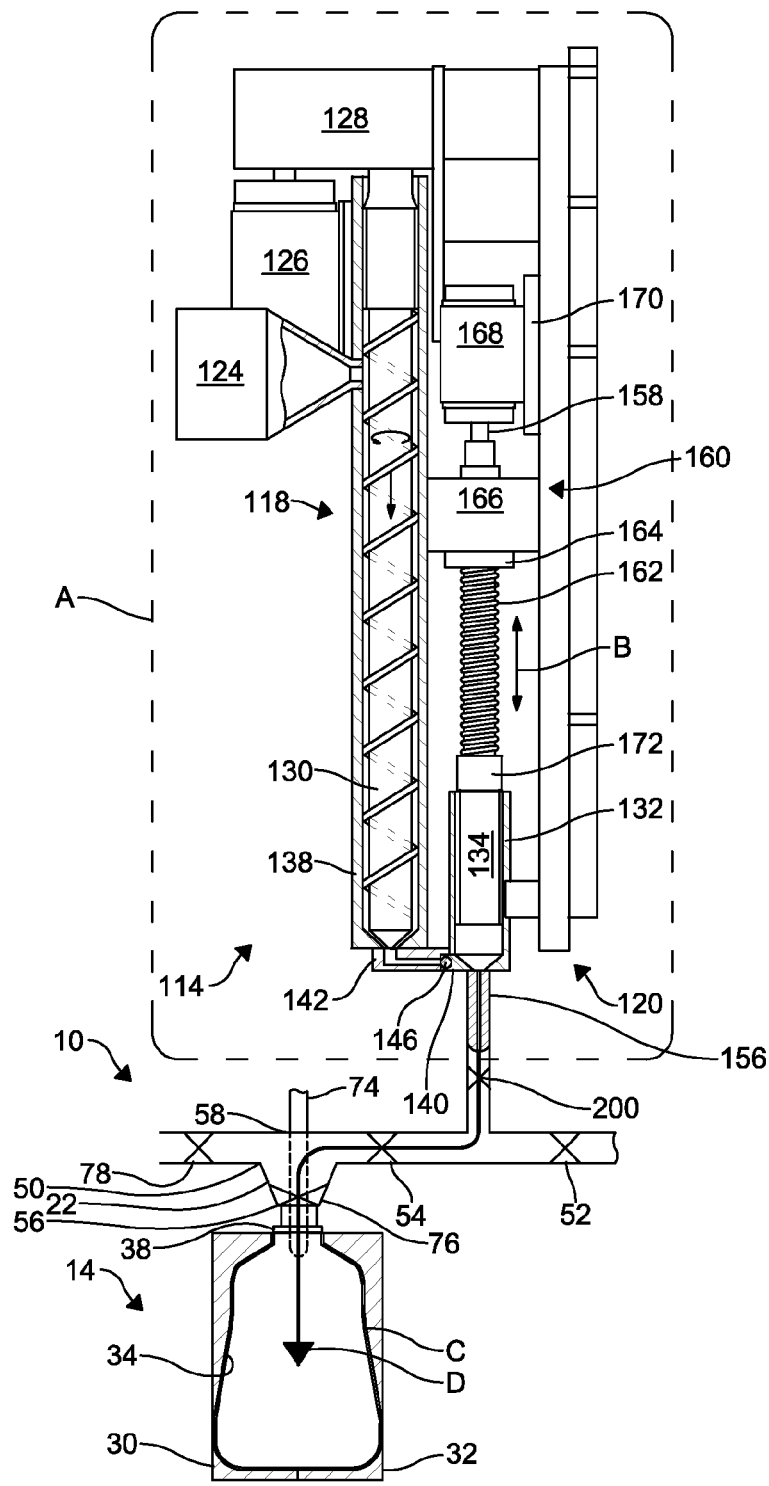
FIG. 6 is a schematic depiction of the system of FIG. 5, where a remainder of the charge of first liquid is being dispensed from the accumulator and transferred by the blow nozzle into the partially expanded preform to finish expansion and forming of the container within the mold, where the stretch rod is being withdrawn.

The charge of reduced-viscosity product is shown dispensed along the path marked by arrow D originating from the two-stage injection unit 114 in FIG. 6. The preform 12 is now fully expanded to contact the internal surface 34 of the mold 14 to form the resultant container C, where the product remains within the container C as an end product. As the reduced-viscosity product causes the partially expanded preform 12 to further and completely expand toward the interior surface 34 of the mold cavity 16, any residual air within the preform 12 can be vented through the passage 74 defined in the stretch rod 26. The stretch rod 26 can be withdrawn from the container C at this point.

Figure 7:
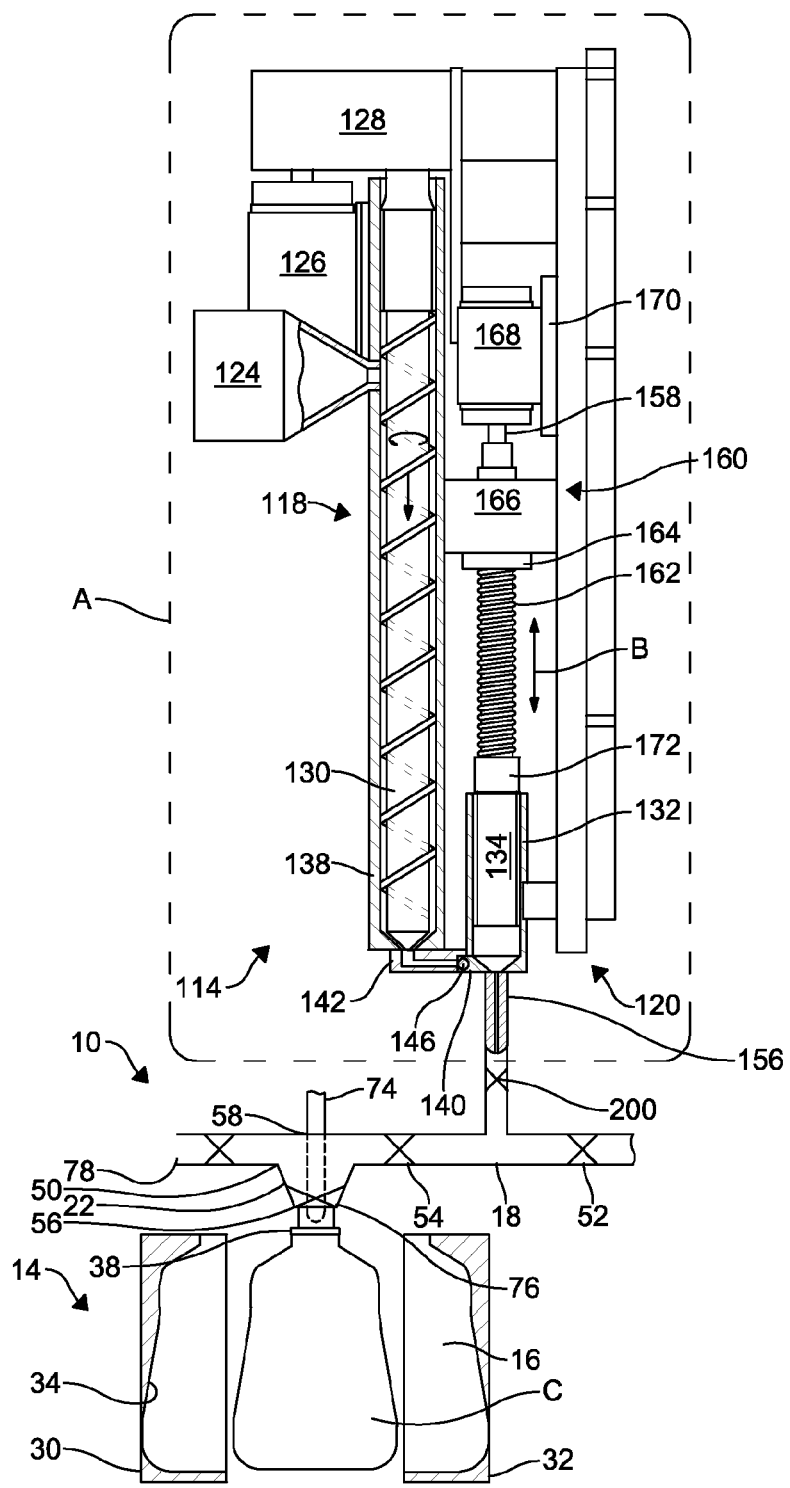
FIG. 7 is a schematic depiction of the system of FIG. 6, where the two-stage injection unit has completed the transfer of the charge of product to the newly formed container, the stretch rod is withdrawn, and the mold halves separate to release the resultant container filled with the product.

As shown in FIG. 7, the two-stage injection unit 114 has completed the dispensing of the charge of reduced-viscosity product, where transfer of the appropriate volume of the product to the newly formed plastic container C is complete. Concomitant with or thereafter, the stretch rod 26 can be completely withdrawn from the formed and filled container C within the mold cavity 16 while continuing to vent any residual air through passage 74. In certain embodiments, the stretch rod 26 can be designed to displace a predetermined volume of the product when it is withdrawn from the mold cavity 16, thereby allowing for a desired fill level of the product within the resultant plastic container C. Generally, the desired fill level can correspond to a level at or near the level of the support ring 38 of the plastic container C.

At this point, the form and fill cycle is complete. The mold halves 30, 32 can separate, the blow nozzle 22 can be withdrawn, and the product filled container C removed from the mold 14. The formed and filled container C can now be subjected to various post-forming steps as desired, including various capping, labeling, and packing operations. The two-stage injection unit 114 can begin another cycle where the extruder 118 imparts mechanical energy to another portion of the product fed from the hopper 124 to reduce the viscosity of the another portion of the product in preparation of transfer thereof to the accumulator 20A. Another preform 12 can be positioned within the mold 14. While not specifically shown, it is appreciated that the system 10 can include a controller for communicating signals to one or more of the various components. In this way, the two-stage injection unit 114, the mold 14, the blow nozzle 22, the stretch rod 26, and the various valves can operate according to one or more signals communicated by the controller. It is also contemplated that the controller can be utilized to adjust various parameters associated with these components according to a given application.

Figure 8B:
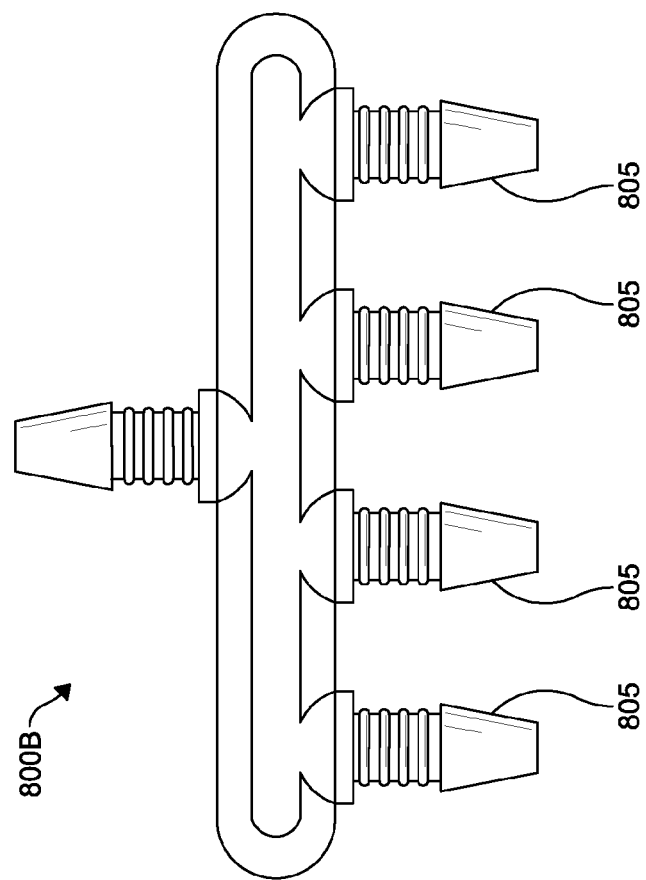
FIGS. 8A-8B are schematic depictions of embodiments of manifolds that can couple a two-stage injection unit to multiple blow nozzles and associated molds.
Figure 8A:
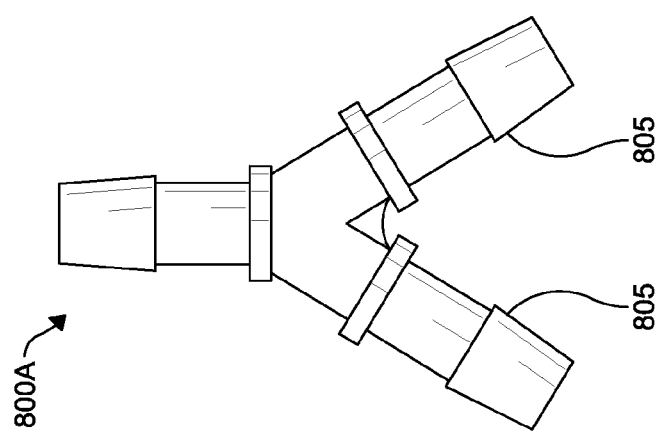

FIGS. 8A-8B are schematic depictions of embodiments of manifolds 800A, 800B that can be used to fluidly couple the two-stage injection unit 114 to multiple blow nozzles 22. In particular, the nozzle 156 from the accumulator 120 can be fluidly coupled to the conduit 18, where the conduit 18 incorporates the manifold 800A, 800B including branches 805 fluidly coupled to multiple blow nozzles 22 and molds 14. Each branch 805 of the manifold 800A, 800B can include a valve (not shown) that can allow the reduced-viscosity product to be selectively directed to certain branches 805 or all the branches 805. FIG. 8A shows a bifurcated manifold 800A that can be used to split the charge of the reduced-viscosity product from the two-stage injection unit 112 into two blow nozzles 22, each blow nozzle 22 fluidly coupled to a respective mold 14. FIG. 8B shows a quadfurcated manifold 800B that can be used to split the charge of the reduced-viscosity product from the two-stage injection unit 114 into four blow nozzles 22, each blow nozzle 22 fluidly coupled to a respective mold 14.

While the present disclosure contemplates the production of PET containers from PET preforms 12, it is understood that other polyolefin materials (e.g., polyethylene, polypropylene, polyester, etc.) as well as a number of other plastics can be processed using the present technology.

The following benefits and advantages can be realized by the present technology. The present systems and ways of using such systems can form and fill a container with a product that is not amenable to other forming and filling operations, such as a highly viscous product, where the highly viscous product remains in the resultant container. Such highly viscous products include those having paste-like or gel-like consistencies that can behave more like solids than liquids. The present technology provides the capability to transfer such highly viscous products within a certain time window and maintain a preform heat profile to reproducibly form and fill a resultant container that exhibits satisfactory performance characteristics. In particular, the present systems and methods can balance thermal energy loss of a preform and a rate of filling/expansion of a forming container to optimize the form/fill steps. Certain highly viscous products (e.g., viscosities in the range of thousands of centipoise to tens of thousands of centipoise) can now be used to form and fill preforms into resultant containers using the present systems. For example, the present technology can form/fill containers using various food products including processed cheese (6,500-30,000 cP), syrups (4,300-8,600 cP), mayonnaise (20,000 cP), various consumer products including shampoo (3,000 cP) and toothpaste (70,000-100,000 cP), various industrial products including acetate glue (1,200-1,400 cP), printers ink (2,200 cP), resin solutions (900-7,200 cP), and triacetate dope (48,000-60,000 cP).

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments can be embodied in many different forms, and that neither should be construed to limit the scope of the disclosure. In some example embodiments, well-known processes, well-known device structures, and well-known technologies are not described in detail. Equivalent changes, modifications and variations of some embodiments, materials, compositions and methods can be made within the scope of the present technology, with substantially similar results.

What is claimed is:

1. A system for simultaneously forming and filling a container with a product comprising:
    a mold cavity defining an internal surface and configured to accept a preform;
    a two-stage injection unit configured to receive the product and dispense the product, the two-stage injection unit including a first stage comprising an extruder and a second stage comprising an accumulator, the extruder configured to impart mechanical energy to the product to reduce a viscosity of the product and transfer the reduced-viscosity product to the accumulator, the accumulator configured to receive the reduced-viscosity product from the extruder and dispense a charge of the reduced-viscosity product; and
    a blow nozzle configured to transfer the charge of the reduced-viscosity product dispensed from the accumulator into the preform to urge the preform to expand toward the internal surface of the mold cavity and form a resultant container, where the reduced-viscosity product remains within the container as an end product.

2. The system of claim 1, wherein the first stage includes a heater configured to impart thermal energy to the product to further reduce the viscosity of the product.

3. The system of claim 1, wherein the accumulator includes a piston configured to drive the charge of the reduced-viscosity product from the accumulator through the blow nozzle at a pressure and within a time period to urge the preform to expand toward the internal surface of the mold cavity and form the resultant container.

4. The system of claim 1, further comprising a stretch rod configured to mechanically stretch the preform within the mold cavity prior to the first liquid at the first pressure being transferred into the preform by the blow nozzle.

5. The system of claim 4, wherein the stretch rod is vented.

6. A method of simultaneously forming and filling a container with a product using the system of claim 1.

* * * * *